US012108002B2

(12) United States Patent
Suzaki

(10) Patent No.: US 12,108,002 B2
(45) Date of Patent: Oct. 1, 2024

(54) INFORMATION PROCESSING APPARATUS CAPABLE OF TRANSMITTING SETTING ITEM TO AN EXTERNAL APPARATUS

(71) Applicant: CANON KABUSHIKI KAISHA, Tokyo (JP)

(72) Inventor: Ryo Suzaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/723,799

(22) Filed: Apr. 19, 2022

(65) Prior Publication Data

US 2022/0345576 A1     Oct. 27, 2022

(30) Foreign Application Priority Data

Apr. 22, 2021   (JP) ................. 2021-072750

(51) Int. Cl.
*H04N 1/00*      (2006.01)
(52) U.S. Cl.
CPC ..... *H04N 1/00498* (2013.01); *H04N 1/00206* (2013.01); *H04N 1/00503* (2013.01); *H04N 1/00928* (2013.01)
(58) Field of Classification Search
CPC .......... H04N 1/00498; H04N 1/00206; H04N 1/00503; H04N 1/00928
See application file for complete search history.

(56) References Cited

U.S. PATENT DOCUMENTS

| 2004/0246762 | A1* | 12/2004 | Inada ............... H04N 1/21 365/145 |
| 2006/0158686 | A1 | 7/2006 | Watanabe |
| 2009/0204923 | A1* | 8/2009 | Tachibana ......... H04N 1/00474 715/771 |
| 2018/0091668 | A1* | 3/2018 | Tanaka ............... H04N 1/00506 |
| 2019/0052762 | A1* | 2/2019 | Tsukada ............ H04N 1/00482 |
| 2020/0233616 | A1* | 7/2020 | Kamiya ............... G06F 3/1203 |

FOREIGN PATENT DOCUMENTS

JP     2006201481 A     8/2006

* cited by examiner

*Primary Examiner* — Nicholas Pachol
(74) *Attorney, Agent, or Firm* — Venable LLP

(57) ABSTRACT

A non-transitory computer-readable storage medium storing a program causes a computer of an information processing apparatus including a communication unit communicable with an external apparatus to function as each of a reception unit configured to receive first information concerning a setting item of the external apparatus transmitted from the external apparatus an acquisition unit configured to acquire second information concerning a setting of the information processing apparatus and a transmission unit configured to cause the communication unit to transmit third information concerning the setting item of the external apparatus based on the first information and the second information to external apparatus.

17 Claims, 8 Drawing Sheets

FIG. 5
500a
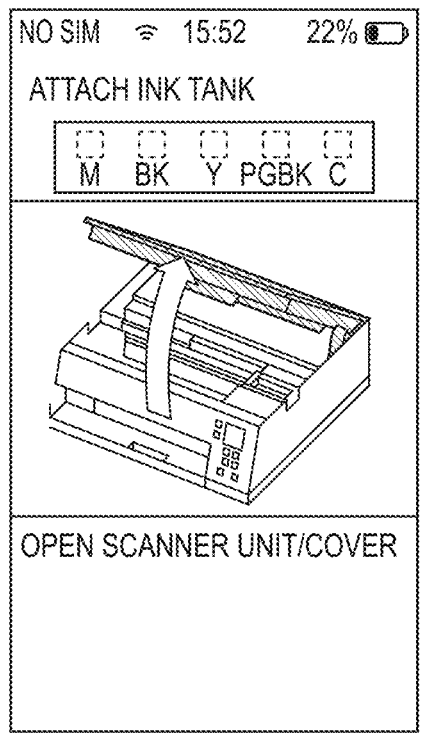
500b
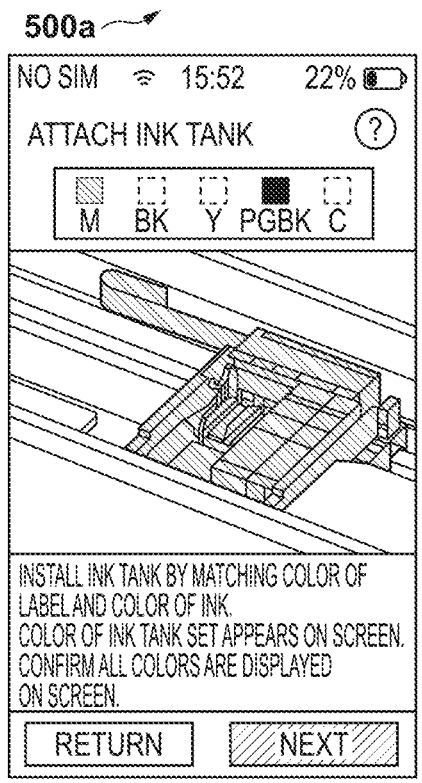
500c
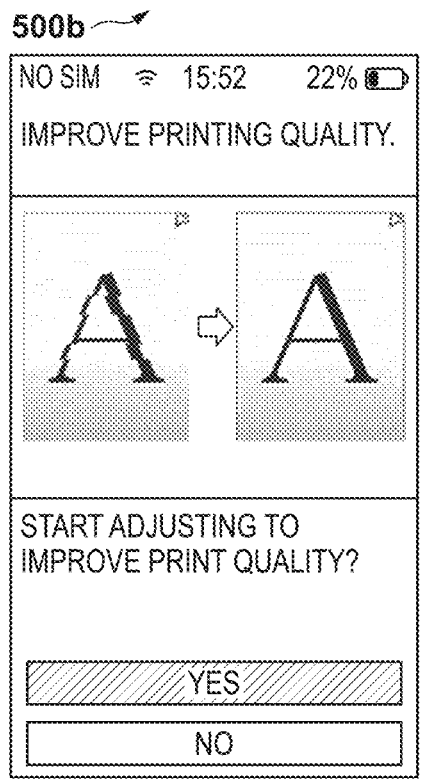
500d

INFORMATION PROCESSING APPARATUS CAPABLE OF TRANSMITTING SETTING ITEM TO AN EXTERNAL APPARATUS

BACKGROUND

Field

The present disclosure relates to a non-transitory computer-readable storage medium and an information processing apparatus.

Description of the Related Art

For an apparatus that executes predetermined processing of a scanner, a printer, or the like, a user who purchased the apparatus needs to install ink and perform an initial setup including a network setting. There is known an apparatus having a function of supporting such initial setup using another information processing apparatus such as a PC or a smartphone to properly make many settings in the initial setup. For example, Japanese Patent Laid-Open No. 2006-201481 describes an arrangement in which a user can connect a printer and a PC at the time of a setup, and confirm, by a list displayed on the PC, whether the setting of each setting item is complete.

SUMMARY

According to one embodiment of the present invention, there is provided a non-transitory computer-readable storage medium storing a program for causing a computer of an information processing apparatus including a communication unit communicable with an external apparatus to function as each of: a reception unit configured to receive first information concerning a setting item of the external apparatus transmitted from the external apparatus; an acquisition unit configured to acquire second information concerning a setting of the information processing apparatus; and a transmission unit configured to cause the communication unit to transmit third information concerning the setting item of the external apparatus based on the first information and the second information to external apparatus.

According to another embodiment of the present invention, there is provided an information processing apparatus communicable with an external apparatus, comprising: a communication unit; a reception unit configured to receive, via the communication unit, first information concerning a setting item of the external apparatus transmitted from the external apparatus; an acquisition unit configured to acquire second information concerning a setting of the information processing apparatus; and a transmission unit configured to cause the communication unit to transmit third information concerning the setting item of the external apparatus based on the first information and the second information to the external apparatus.

Further features of the present invention will become apparent from the following description of exemplary embodiments (with reference to the attached drawings).

BRIEF DESCRIPTION OF THE DRAWINGS

FIG. 5 is a view showing examples of the screen of the terminal apparatus;

DESCRIPTION OF THE EMBODIMENTS

Figure 1:
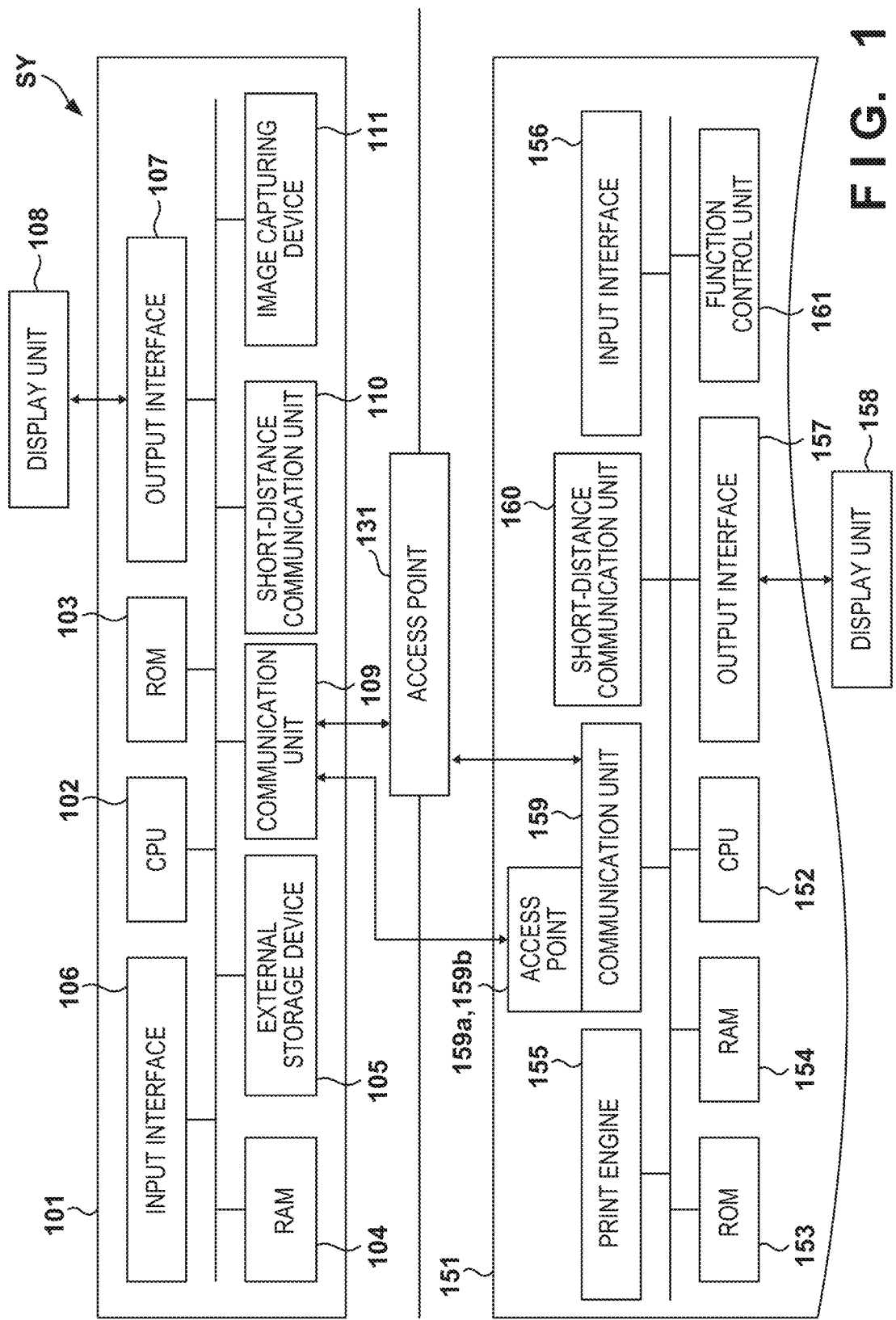
FIG. 1 is a block diagram showing the configuration of a communication system according to an embodiment.

In the above conventional technique, however, the user can confirm, by the list, whether the setting of each setting item is complete, but the user needs to manually make the setting. Therefore, it takes time for the user to make various settings of the apparatus including the initial setup, degrading usability.

This embodiment provides a technique of improving usability in the setting of the apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<System Configuration>

FIG. 1 is a block diagram showing the configuration of a communication system SY according to the embodiment. The communication system SY includes a terminal apparatus 101 and a printing apparatus 151.

The terminal apparatus 101 is an information processing apparatus communicable with the printing apparatus 151 as an external apparatus. In this embodiment, a smartphone is exemplified as the terminal apparatus 101 but the present invention is not limited to this and various apparatuses such as a portable terminal, a notebook PC, a tablet terminal, a PDA (Personal Digital Assistant), and a digital camera can be used.

The printing apparatus 151 is an apparatus communicable with the terminal apparatus 101 as an external apparatus. In this embodiment, the printing apparatus 151 is exemplified as an apparatus communicable with an external apparatus but various apparatuses can be adopted. For example, the apparatus communicable with an external apparatus may be a printer such as an inkjet printer, a full color laser beam printer, or a monochrome printer. The apparatus communicable with an external apparatus may be a copying machine, a facsimile apparatus, a portable terminal, a smartphone, a notebook PC, a tablet terminal, a PDA, a digital camera, a music reproduction device, a television, a smart speaker, or the like instead of the printer. Alternatively, the apparatus communicable with an external apparatus may be a multi-function peripheral having a plurality of functions such as a copy function, a FAX function, and a print function. That is, the apparatus communicable with an external apparatus can be an apparatus that can communicate with the external apparatus and also execute predetermined processing. The arrangements of the terminal apparatus 101 and the printing apparatus 151 will be described in detail below but their functions are not limited to those shown in FIG. 1.

<Terminal Apparatus 101>

The terminal apparatus 101 includes a CPU 102, a ROM 103, a RAM 104, an external storage device 105, an input interface 106, an output interface 107, a display unit 108, a communication unit 109, a short-distance communication unit 110, and an image capturing device 111.

The CPU 102 is a system control unit, and controls the overall terminal apparatus 101.

The ROM 103 stores permanent data such as control programs to be executed by the CPU 102, data tables, and an embedded operating system (to be referred to as an OS hereinafter). In this embodiment, the respective control programs stored in the ROM 103 perform software execution control such as scheduling, task switch, and interrupt processing under the management of the embedded OS stored in the ROM 103.

The RAM 104 is formed by an SRAM (Static Random Access Memory) or the like which needs a backup power supply. Note that the RAM 104 can store important data such as program control variables without volatilization because the data are held by a primary battery (not shown) for data backup. In addition, a memory area that stores setting information of the terminal apparatus 101, management data of the terminal apparatus 101, and the like is also provided in the RAM 104. Furthermore, the RAM 104 is used as the main memory and the work memory of the CPU 102.

The external storage device 105 stores a program of an application (a setup application to be described later) that provides a setup function of the printing apparatus 151. The external storage device 105 also stores various programs such as a print information generation program for generating print information interpretable by the printing apparatus 151, and an information transmission/reception control program for performing transmission/reception to/from the printing apparatus 151 connected via the communication unit 109. In addition, the external storage device 105 saves various kinds of information to be used by the programs and image data obtained from another information processing apparatus or the Internet.

The input interface 106 is an interface configured to accept a data input or an operation instruction from a user, and can include a physical keyboard, buttons, and a touch panel. Note that the output interface 107 and the display unit 108 may have the same arrangement as that of the input interface 106 like a touch panel or the like, and output of a screen and acceptance of an operation from the user may be done by the same arrangement.

The output interface 107 is an interface configured to perform control for causing the display unit 108 to display data or make a notification of the state of the terminal apparatus 101.

The display unit 108 is formed by an LED (Light-Emitting Diode), an LCD (Liquid Crystal Display), or the like, and displays data or makes a notification of the state of the terminal apparatus 101. Note that a software keyboard including keys such as numerical value input keys, a mode setting key, an enter key, a cancel key, and a power key may be installed on the display unit 108 to accept an input from the user via the display unit 108.

The communication unit 109 is connected to an apparatus such as the printing apparatus 151 to execute data communication. For example, the communication unit 109 may directly communicate with the printing apparatus 151 by wireless communication. The communication unit 109 may communicate with the printing apparatus 151 via an external access point (an access point 131 (to be referred to as the AP 131 hereinafter)) that exists outside the terminal apparatus 101 and the printing apparatus 151. In this example, the AP 131 is an apparatus that creates a network, and decides a communication channel to be used for communication in the created network. In this embodiment, as the wireless communication method of the communication unit 109, Wi-Fi (Wireless Fidelity) is used but Bluetooth Classic or the like may be used. As the AP 131, for example, a device such as a wireless LAN router can be used. Note that in the following description, a method of connecting the terminal apparatus 101 and the printing apparatus 151 directly without intervention of the AP 131 will be referred to as a direct connection method. In addition, a method of connecting the terminal apparatus 101 and the printing apparatus 151 via the AP 131 will be referred to as an infrastructure connection method hereinafter.

The short-distance communication unit 110 is wirelessly connected to an apparatus such as the printing apparatus 151 in a short distance to execute data communication. The short-distance communication unit 110 performs communication using a communication method different from that of the communication unit 109. The short-distance communication unit 110 can be connected to a short-distance communication unit 160 in the printing apparatus 151. As the communication method of the short-distance communication unit 110, Bluetooth Low Energy (BLE), Bluetooth Classic, Wi-Fi Aware, or the like can be used.

The image capturing device 111 is a device that converts an image captured by an image sensor into digital data. The digital data is stored in the RAM 104 once. After that, the digital data is converted into a predetermined image format by the program executed by the CPU 102, and saved as image data in the external storage device 105.

<Printing Apparatus 151>

The printing apparatus 151 includes a CPU 152, a ROM 153, a RAM 154, a print engine 155, an input interface 156, an output interface 157, a display unit 158, a communication unit 159, a short-distance communication unit 160, and a function control unit 161.

The CPU 152 is a system control unit, and controls the overall printing apparatus 151.

The ROM 153 stores permanent data such as control programs to be executed by the CPU 152, data tables, and an OS program. In this embodiment, the respective control programs stored in the ROM 153 perform software execution control such as scheduling, task switch, and interrupt processing under the management of the embedded OS stored in the ROM 153. A memory area that stores data necessary to be held even when no power is supplied, such as setting information of the printing apparatus 151 and management data of the printing apparatus 151, is also provided in the ROM 153.

The RAM 154 is formed by a DRAM or the like which needs a backup power supply. Note that the RAM 154 can store important data such as program control variables without volatilization because the data are held by supplying power for data backup (not shown). Furthermore, the RAM 154 is used as the main memory and the work memory of the CPU 152, is used as a reception buffer for temporarily saving print information received from the terminal apparatus 101 or the like, and saves various kinds of information.

Based on the information stored in the RAM 154 or a print job received from the terminal apparatus 101 or the like, the print engine 155 forms an image on a print medium such as a paper sheet using a printing material such as ink and outputs the print result. Note that since the print job transmitted from the terminal apparatus 101 or the like has a large transmission data amount, and high-speed communication is required, the print engine 155 receives the print job via the communication unit 159 capable of performing communication at a higher speed than the short-distance communication unit 160.

The input interface 156 is an interface configured to accept a data input and an operation instruction from the user, and is formed by a physical keyboard, buttons, a touch panel, and the like. Note that the output interface 157 and the input interface 156 (to be described later) may have the same arrangement, and output of a screen and acceptance of an operation from the user may be done by the same arrangement.

The output interface 157 is an interface configured to perform control for causing the display unit 158 to display data or make a notification of the state of the printing apparatus 151.

The display unit 158 is formed by an LED (Light Emitting Diode), an LCD (Liquid Crystal Display), or the like, and displays data or makes a notification of the state of the printing apparatus 151. Note that a software keyboard including keys such as numerical value input keys, a mode setting key, an enter key, a cancel key, and a power key may be installed on the display unit 158 to accept an input from the user via the display unit 158.

The communication unit 159 is connected to an apparatus such as the terminal apparatus 101 to execute data communication. In this embodiment, as the wireless communication method of the communication unit 159, Wi-Fi is used but Bluetooth Classic or the like may be used. Note that the communication unit 159 includes, as an access point in the printing apparatus 151, an AP 159a (to be referred to as the AP 159a hereinafter) for performing connection to an apparatus such as the terminal apparatus 101. The AP 159a can be connected to the communication unit 109 of the terminal apparatus 101. Note that the communication unit 159 may directly communicate with the terminal apparatus 101 via the AP 159a or may communicate with the terminal apparatus 101 via the external AP 131. The AP 159a may be a hardware component functioning as an access point or the communication unit 159 may operate as the AP 159a by software for functioning as an access point. The following description assumes that the communication unit 159 operates as the AP 159a by software for functioning as an access point. The AP 159a in the printing apparatus 151 may be formed by a plurality of access points having different SSIDs and passwords. This embodiment assumes that the AP 159a in the printing apparatus 151 includes at least a connection setting AP 159b (to be described later).

The short-distance communication unit 160 is wirelessly connected to an apparatus such as the terminal apparatus 101 in a short distance to execute data communication. The short-distance communication unit 160 performs communication using a communication method different from that of the communication unit 159. The short-distance communication unit 160 can be connected to the short-distance communication unit 110 of the terminal apparatus 101. As the communication method of the short-distance communication unit 160, Bluetooth Low Energy (BLE), Bluetooth Classic, Wi-Fi Aware, or the like can be used.

The function control unit 161 manages a function operation of whether to operate the functions of the printing apparatus 151 simultaneously.

<Wi-Fi Communication (P2P (Peer to Peer) Mode)>

In this embodiment, to establish connection (to be referred to as P2P connection hereinafter) by the P2P method in Wi-Fi communication, the printing apparatus 151 can operate in a P2P mode (a software AP mode or a Wi-Fi Direct (WFD) mode). The P2P connection indicates connection by a method in which apparatuses are directly, wirelessly connected to each other without intervention of an external apparatus such as the AP 131. While operating in the P2P mode, the printing apparatus 151 operates as a master device in the network to which the printing apparatus 151 belongs. The P2P mode includes the WFD mode and the software AP mode to be described below.

Note that WFD is a standard defined by the Wi-Fi Alliance. The terminal apparatus 101 and the printing apparatus 151 as WFD-compatible devices can directly, wirelessly be connected to each other by WFD without intervention of another access point. An apparatus that is a WFD-compatible device and performs the role of an access point (master station) will be particularly referred to as a group owner. A mode for executing P2P connection by WFD will be referred to as the WFD mode hereinafter.

The printing apparatus 151 also has a software access point (software AP) function of causing the communication unit 159 to operate as the AP 159a. The printing apparatus 151 enables (activates) the software AP in the printing apparatus 151, and the terminal apparatus 101 is connected to the software AP not by WFD but by normal Wi-Fi. This allows the terminal apparatus 101 and the printing apparatus 151 to be directly, wirelessly connected to each other without intervention of another access point. A mode in which the communication unit 159 of the printing apparatus 151 executes P2P connection by enabling and operating the software AP in the communication apparatus 151 will be referred to as the software AP mode hereinafter. Note that when the software AP mode stops, the printing apparatus 151 disables the software AP in the communication apparatus 151, and is set in a state in which it cannot perform P2P connection to another apparatus using the software AP.

Since the printing apparatus 151 operates as the master device in the P2P mode, the printing apparatus 151 can decide which communication channel is to be used for communication in the P2P mode. For example, if the printing apparatus 151 operates in the infrastructure mode and the P2P mode in parallel, it performs control to use, for communication in the P2P mode, the communication channel being used for communication in the infrastructure mode. In addition, for example, the printing apparatus 151 may preferentially select, as the channel to be used for communication in the P2P mode, the communication channel used for connection to the AP 131 over another channel. Furthermore, connection information (an SSID and a password) used by another apparatus to perform connection to the printing apparatus 151 in the P2P mode may be changed arbitrarily by a user operation or the like via the input interface 106 of the printing apparatus 151.

<Wi-Fi Communication (Infrastructure Mode)>

In this embodiment, to establish connection (to be referred to as infrastructure connection hereinafter) by the infrastructure method in Wi-Fi communication, the printing apparatus 151 can operate in the infrastructure mode. Note that in this embodiment, the infrastructure connection indicates connection by a method in which an external apparatus such as the AP 131 that generally controls the network operates as a master device and apparatuses are wirelessly connected to each other via the master device. While operating in the infrastructure mode, the printing apparatus 151 operates as a slave device in the network to which the printing apparatus 151 belongs.

In the infrastructure mode, the printing apparatus 151 and the terminal apparatus 101 are connected to each other via the AP 131. Therefore, the printing apparatus 151 and the terminal apparatus 101 can communicate with each other via the AP 131. Note that the channel used for communication in the infrastructure mode may be, for example, a channel of a frequency band (5.0-GHz band or the like) other than the 2.4-GHz band.

Note that to communicate with the printing apparatus 151 via the AP 131, the terminal apparatus 101 needs to recognize that the printing apparatus 151 belongs to the network which is formed by the AP 131 and to which the terminal apparatus 101 belongs. More specifically, the terminal apparatus 101 transmits, via the AP 131, a search signal to the network to which the terminal apparatus 101 belongs, and confirms communication with the printing apparatus 151.

Note that in this embodiment, a state in which the terminal apparatus 101 and the printing apparatus 151 are simply connected to the same AP 131 is regarded as an infrastructure connection state. That is, in this embodiment, even if the terminal apparatus 101 or the printing apparatus 151 does not recognize that the partner apparatus belongs to the network to which the self-apparatus belongs, if the terminal apparatus 101 or the printing apparatus 151 is connected to the same AP 131, the state is regarded as the infrastructure connection state.

<Connection Setting Mode>

In this embodiment, to transmit/receive information in connection setting processing of the terminal apparatus 101 and the printing apparatus 151, P2P connection for connection setting between the terminal apparatus 101 and the printing apparatus 151 is used. A mode when the printing apparatus 151 performs P2P connection for connection setting will sometimes be referred to as a connection setting mode hereinafter. More specifically, P2P connection for connection setting is used to transmit an infrastructure setting command or a P2P setting command and to transmit/receive various kinds of information to establish P2P connection. Furthermore, in this embodiment, as P2P connection for connection setting, connection by Wi-Fi (connection by the communication units 109 and 159) is used. However, connection by BLE (connection by the short-distance communication units 110 and 160) may be used as P2P connection for connection setting. Furthermore, for example, a communication method other than Wi-Fi or BLE, such as Bluetooth Classic, may be used as P2P connection for connection setting.

As described above, the printing apparatus 151 can operate in the connection setting mode. A trigger for the printing apparatus 151 to start an operation in the connection setting mode can be, for example, the pressing of a connection setting mode button by the user or the initial activation (power-on) of the printing apparatus 151 after arrival at the location of the user. The connection setting mode button may be a hardware button provided in the printing apparatus 151 or a software button displayed on the display unit 158 by the printing apparatus 151.

After the start of an operation in the connection setting mode, the printing apparatus 151 enables both Wi-Fi communication and BLE communication. More specifically, as the processing of enabling Wi-Fi communication, the printing apparatus 151 enables the connection setting AP 159b dedicated for the connection setting mode included in the printing apparatus 151. This sets the printing apparatus 151 in a state in which it can establish P2P connection to the terminal apparatus 101 by Wi-Fi. In this example, the terminal apparatus 101 holds in advance, in the setup application installed in the terminal apparatus 101, the connection information (the SSID and password) for performing connection to the connection setting AP 159b, and thus recognizes in advance this connection information. Therefore, unlike the connection information of another AP that is enabled in the P2P mode, the connection information for performing connection to the connection setting AP 159b cannot be changed arbitrarily by the user. Note that in the connection setting mode, the printing apparatus 151 may be connected to the terminal apparatus 101 not by normal Wi-Fi but by Wi-Fi Direct (WFD). That is, the printing apparatus 151 may operate as a group owner and receive a setting command from the terminal apparatus 101 by communication by WFD.

The printing apparatus 151 also starts transmission of the advertising information as the processing of enabling BLE communication. This sets the printing apparatus 151 in a state in which it can establish connection to the terminal apparatus 101 by BLE. Note that in this embodiment, the printing apparatus 151 is set in a state in which it can receive a BLE pairing request during a predetermined period after BLE communication is enabled. Then, if the printing apparatus 151 receives a BLE pairing request during the predetermined period, paring with the apparatus as the transmission source of the pairing request is performed to establish BLE connection. If no BLE pairing request is received during the predetermined period, the printing apparatus 151 may disable BLE communication.

After enabling both Wi-Fi communication and BLE communication in the connection setting mode, the printing apparatus 151 receives setting commands via these communications, and executes processing corresponding to each received setting command.

After infrastructure connection or P2P connection by Wi-Fi is established between the terminal apparatus 101 and the printing apparatus 151 by the connection setting processing, the terminal apparatus 101 and the printing apparatus 151 can communicate with each other via the established connection. For example, the terminal apparatus 101 can transmit, to the printing apparatus 151 via the established connection, a print job for causing the printing apparatus 151 to execute printing and a scan job for causing the printing apparatus 151 to execute a scan.

<Connection Setting Processing and Registration Processing Using Wi-Fi>

Figure 2:
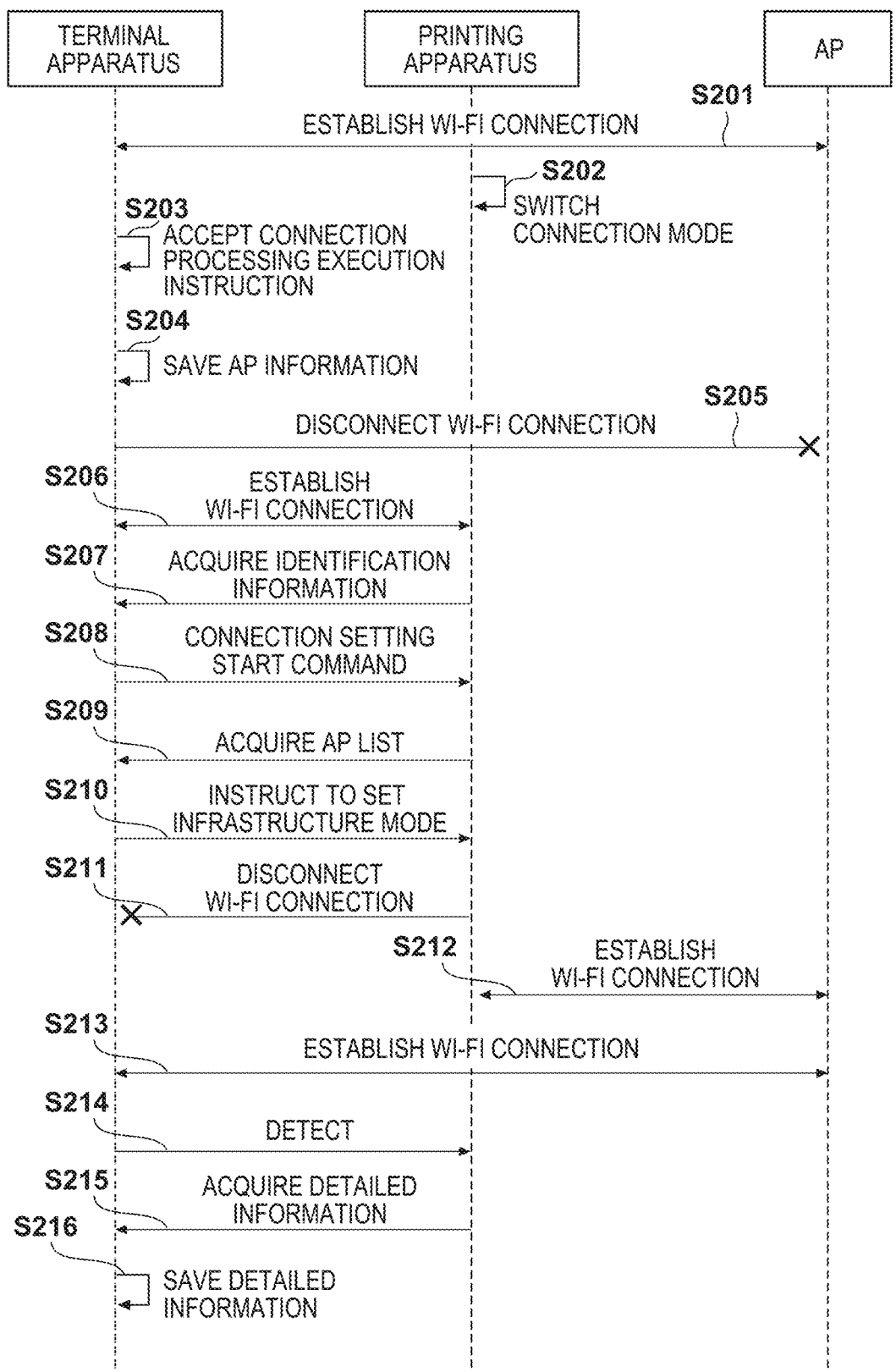
FIG. 2 is a sequence chart showing processing executed by each apparatus in connection setting processing using Wi-Fi.

FIG. 2 is a sequence chart showing processes executed by the respective apparatuses in the connection setting processing using Wi-Fi. Each process shown in the sequence chart of FIG. 2 is implemented when, for example, the CPU of each apparatus reads out a program stored in the memory of each apparatus to the RAM of each apparatus and executes the program. Each step will simply be referred to as S201 or the like hereinafter.

In S201, the terminal apparatus 101 is connected to the AP 131 by Wi-Fi.

In S202, the printing apparatus 151 starts an operation in the connection setting mode. After the start of the operation in the connection setting mode, the printing apparatus 151 enables the connection setting AP 159b dedicated for the connection setting mode included in the printing apparatus

151. This sets the printing apparatus 151 in a state in which it can establish P2P connection to the terminal apparatus 101 by Wi-Fi. In this embodiment, after the start of the operation in the connection setting mode, the printing apparatus 151 further enables the BLE function to start transmission of the advertising information. This sets the printing apparatus 151 in a state in which it can establish connection to the terminal apparatus 101 by BLE.

In S203, the terminal apparatus 101 accepts an execution instruction of the connection setting processing from the user via the screen of the setup application displayed on the display unit 108.

In S204, the terminal apparatus 101 saves, in the memory, the information concerning the AP (AP 131) that is connected when the execution instruction of the connection setting processing is accepted. The information concerning the AP 131 is, for example, the connection information (the SSID and the password) for performing connection to the AP 131, information concerning the frequency and the channel used for connection to the AP 131, or the like.

In S205, the terminal apparatus 101 disconnects the Wi-Fi connection from the AP 131.

In S206, the terminal apparatus 101 establishes Wi-Fi connection to the connection setting AP 159*b* in the printing apparatus 151 using the connection information for performing connection to the connection setting AP 159*b* recognized in advance. This causes the terminal apparatus 101 to temporarily establish P2P connection to the printing apparatus 151 by Wi-Fi.

In S207, the terminal apparatus 101 communicates with the printing apparatus 151 to acquire identification information for specifying the printing apparatus 151, and saves the identification information in the memory. The identification information for specifying the printing apparatus 151 may be, for example, a serial number, a MAC address (Media Access Control Address), or a Bonjour name.

In S208, the terminal apparatus 101 transmits a start command of the connection setting processing to the printing apparatus 151 via the Wi-Fi connection. Note that since an AP list (to be described later) is received after the start command of the connection setting processing is transmitted, the start command of the connection setting processing may be regarded as a request command of the AP list.

In S209, the printing apparatus 151 searches for an access point to which the self-apparatus can be connected by Wi-Fi. Then, the printing apparatus 151 transmits, as a search result, the list (AP list) of access points, to which the self-apparatus can be connected by Wi-Fi, to the terminal apparatus 101 via the Wi-Fi connection. That is, the terminal apparatus 101 acquires the AP list from the printing apparatus 151 via the Wi-Fi connection. The access point search timing is not limited to this timing, and may be, for example, the timing immediately after the start of the operation in the connection setting mode or the like.

In S210, the terminal apparatus 101 transmits the infrastructure setting command to the printing apparatus 151 via the Wi-Fi connection. The infrastructure setting command includes the connection information for performing connection to an access point for performing connection to the printing apparatus 151. For example, if the AP list includes the AP 131 saved in the memory in S204, the access point for performing connection to the printing apparatus 151 is the AP 131 saved in the memory in S204. Alternatively, for example, if the AP list does not include the AP 131 saved in the memory in S204, the access point for performing connection to the printing apparatus 151 is an access point selected from the AP list by the user. A case in which the access point for performing connection to the printing apparatus 151 is the AP 131 saved in the memory in S204 will now be described. Note that at this time, the terminal apparatus 101 may accept, from the user, the input of additional connection information (a password and the like) for performing connection to the AP 131, and also transmit the additional connection information as the infrastructure setting command to the printing apparatus 151.

In S211, the terminal apparatus 101 disconnects the P2P connection by Wi-Fi from the printing apparatus 151.

In S212, based on the infrastructure setting command, the printing apparatus 151 is connected to the AP 131 by Wi-Fi using the connection information for performing connection to the AP 131, which has been received in S210. This establishes infrastructure connection between the terminal apparatus 101 and the printing apparatus 151 via the AP 131.

In S213, the terminal apparatus 101 is reconnected to the AP 131 by Wi-Fi using the connection information for performing connection to the AP 131 saved in the memory in S204.

In S214, the terminal apparatus 101 detects the printing apparatus 151 on the network created by the AP 131 using the identification information for specifying the printing apparatus 151 saved in the memory in S207.

In S215, the terminal apparatus 101 acquires detailed information of the printing apparatus 151 from the printing apparatus 151 via the network created by the AP 131. The detailed information of the printing apparatus 151 is information for using the function of the printing apparatus 151 on the terminal apparatus 101. For example, the detailed information of the printing apparatus 151 includes information such as items (a medium size, a medium type, a color/monochrome setting, a bordered/borderless setting, a double-sided printing setting, and the like) settable when executing printing or the presence/absence of the scan function.

In S216, the terminal apparatus 101 saves the detailed information of the printing apparatus 151 acquired in S215. At this time, the saving destination of the detailed information of the printing apparatus 151 may be a nonvolatile area such as the ROM 103.

The above sequence establishes infrastructure connection between the terminal apparatus 101 and the printing apparatus 151 via the AP 131.

<Processing After Connection>

Figure 3:
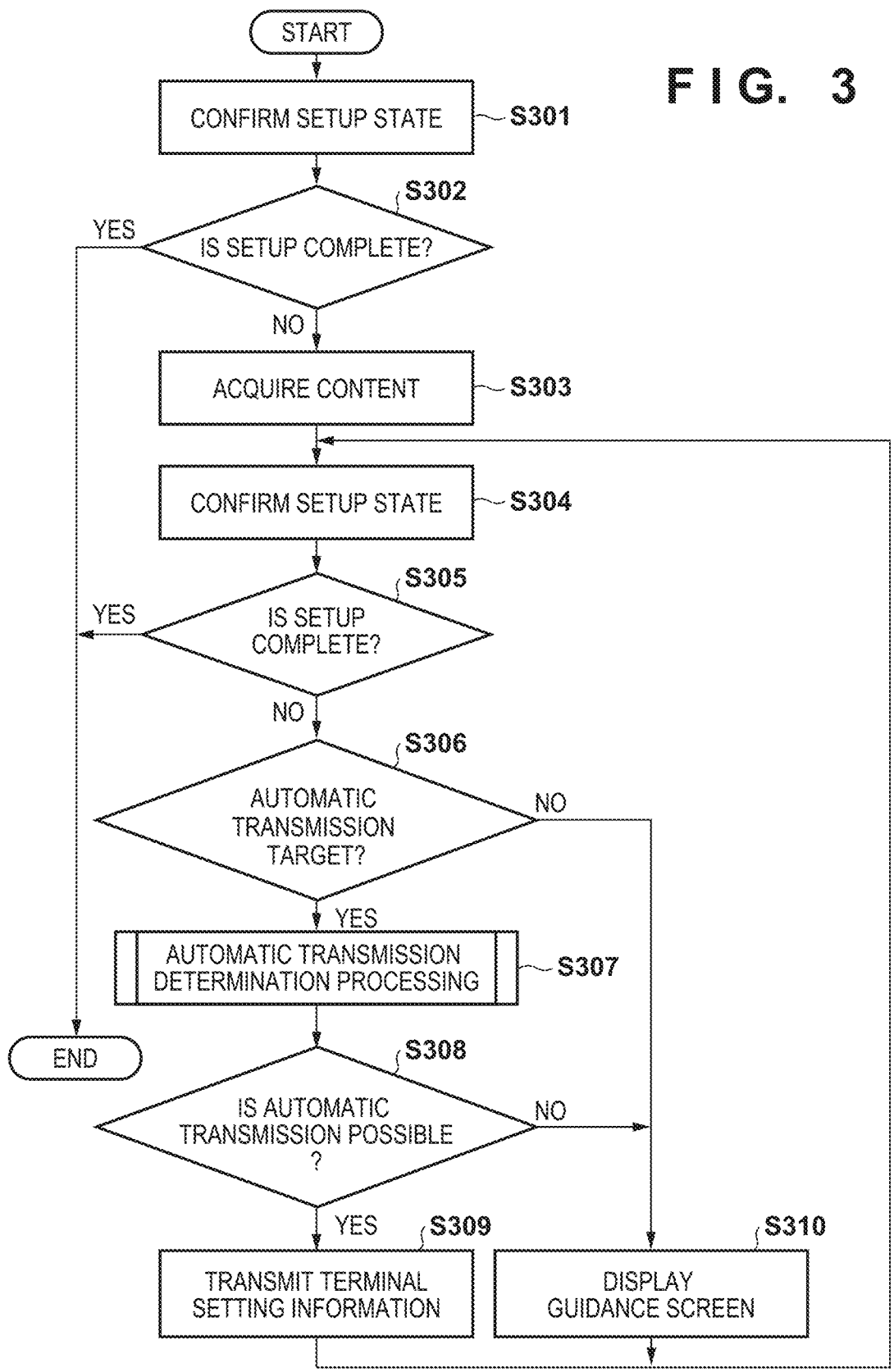
FIG. 3 is a flowchart illustrating an example of processing by a CPU of a terminal apparatus.

FIG. 3 is a flowchart illustrating an example of processing by the CPU 102 of the terminal apparatus 101. This flowchart is implemented when the CPU 102 reads out a program for the setup application installed in the terminal apparatus 101 to the RAM 104 and executes the program. For example, this flowchart is executed after infrastructure connection is established between the terminal apparatus 101 and the printing apparatus 151 via the AP 131.

Figure 7A:
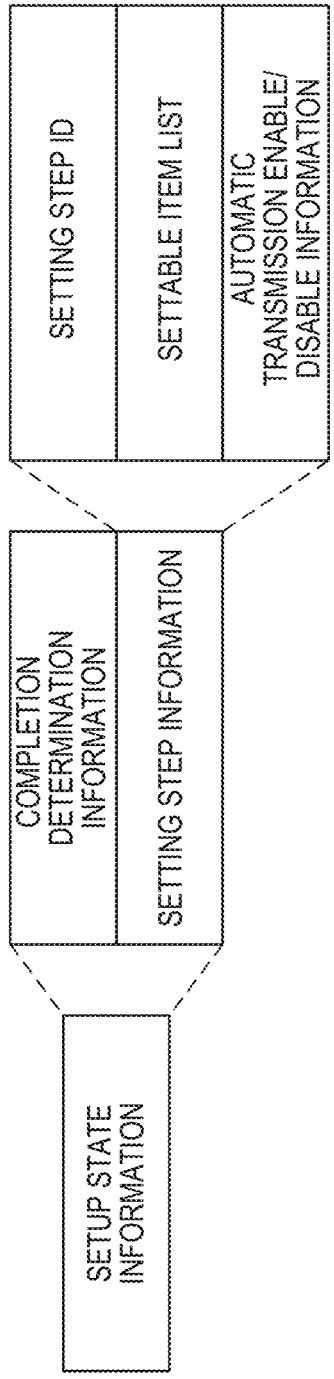
FIG. 7A is a view schematically showing contents of information included in setup state information.

In S301, the setup application confirms the setup state of the printing apparatus 151. In this embodiment, the setup application receives setup state information from the printing apparatus 151 via the communication unit 109. The setup state information may be, for example, a character string in the XML format. For example, the setup state information may be in the HTML format or the JSON format. The setup application acquires necessary information by parsing the setup state information in accordance with the format. FIG. 7A is a view schematically showing contents of information included in the setup state information.

In this embodiment, the setup state information includes completion determination information of whether the printing apparatus 151 has completed the setup. In this example, the completion determination information can include information of whether settings from when the printing apparatus 151 is initially activated after arrival of the printing apparatus 151 at the location of the user until the printing apparatus 151 is set in a usable state have completed.

More specifically, if the information included in the completion determination information is described as a parameter of an XML tag such as <printer setup>, a setup incompletion state may be determined. If the information included in the completion determination information is described as a null element tag such as <printer setup>, a setup completion state may be determined. The completion determination information is not limited to this and, for example, the setup completion or incompletion state may be determined by a parameter character string of a specific XML tag.

The setup state information includes setting step information indicating a specific setting step in the setup currently performed by the printing apparatus 151. The setting step information is an XML tag that includes XML tag information included in the setting step information (to be described later).

The setting step information includes a unique setting step ID assigned to each setting step described as a parameter of an XML tag. The setting step ID may be a number or, for example, a character string like "cover open" in a step of "opening a cover".

Furthermore, the setting step information includes a list of settable items in the setting step. Examples of the settable item list are a list of language codes defined by ISO 639 when setting a language, and a list of country codes defined by ISO 3166 when setting country information.

Furthermore, the setting step information includes automatic transmission enable/disable information for determining whether the setting step allows automatic transmission by the setup application. The automatic transmission enable/disable information includes, as a determination condition, a specific character string. For example, if true is described as a parameter of an XML tag such as "auto_reply", automatic transmission is possible, and if false is described, automatic transmission is impossible.

Note that the setup application may receive only the completion determination information as the setup state information in S301. Then, the setup application may receive the completion determination information and the setting step information as the setup state information in S304 (to be described later).

If it is determined in S302 based on the completion determination information acquired in S301 that the setup of the printing apparatus 151 has completed, the setup application ends the flowchart; otherwise, the process advances to S303.

In S303, the setup application acquires guidance content. The guidance content is content for displaying a guidance for the setup of the printing apparatus 151 to the user via the display unit 108. For example, the setup application acquires, via a network such as the Internet, guidance content held in an external server. For example, the setup application also acquires, by communication via the AP 131, guidance content held in the printing apparatus 151. Furthermore, for example, the setup application acquires guidance content held as a bundle by itself.

Figure 7B:
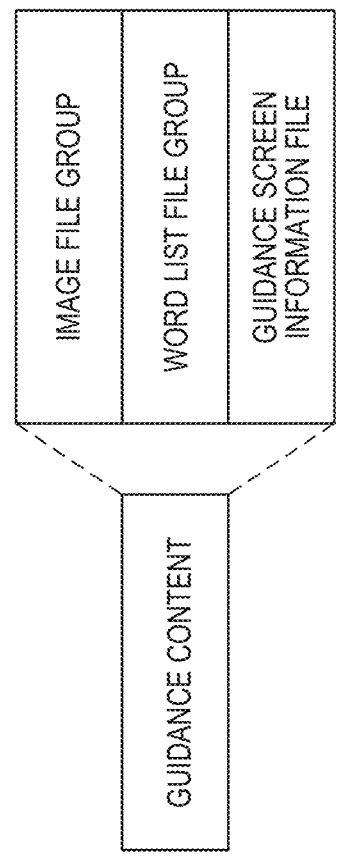
FIG. 7B is a view schematically showing contents of information included in guidance content.

FIG. 7B is a view schematically showing contents of information included in the guidance content. In this embodiment, the guidance content includes an image file group to be displayed on the display unit 108 in each setting step, a word list file group for display, and a guidance screen information file of an image file and words for display. The image file group includes still image files or moving image files whose format is PNG, JPEG, GIF, or the like.

The word list file group is obtained by forming, as a file for each language, a list of pairs of word IDs and localized words associated with the word IDs. The format of each file is assumed to be the XML format but the present invention is not limited to this. Furthermore, each file includes, for example, a language code defined by ISO 639 in a file name, and the setup application compares the file name of the word list with the language code of the language set in the terminal apparatus 101, thereby deciding the file to be used. Note that if the language set in the terminal apparatus 101 does not exist in the word list file group, for example, a language such as English set by the setup application by default is used instead.

The guidance screen information file is a file in the XML format in which the guidance screen information of the image file and the words for display is described. The guidance screen information includes a plurality of setting step tags in each of which the setting step ID of the setting step information is designated as an attribute. In each setting step tag, an image file name and a word ID are set as parameters in the designated XML tag in accordance with the screen format determined in advance by the setup application. For example, the word ID of a screen title is designated in a <title> tag, and the file name of an image file to be displayed in the center of the screen is designated in a <content> tag. Note that the above-described automatic transmission enable/disable information for determining whether automatic transmission by the setting application is allowed, which can be acquired from the printing apparatus 151, may be included in the setting step tag. In this case, when an automatic transmission enable tag such as <auto_reply/> is included, it may be determined that automatic transmission is possible.

S304 and S305 correspond to the same processes as those in S301 and S302, respectively. If it is confirmed in S304 that the setup of the printing apparatus 151 is incomplete in S301 and S302, the setup application requests the setup state information of the printing apparatus 151 again, and receives the information. If it is determined in S305 that the setup of the printing apparatus 151 is incomplete, the process advances to S306.

In S306, the setup application determines whether the printing apparatus 151 currently performs the setting step of an automatic transmission target. If the printing apparatus 151 currently performs the step of the automatic transmission target, the setup application advances to S307; otherwise, the setup application advances to S310. More specifically, if true is described as a parameter of an XML tag of the automatic transmission enable/disable information acquired in S304, the setup application advances to S307. Alternatively, if false is described, the setup application advances to S310.

Note that if the automatic transmission enable/disable information is included in the guidance information file acquired from the external server instead of being acquired in S304, the setup application makes determination as follows. That is, the setup application searches for the setting step ID acquired in S304 in the guidance information file, and confirms whether the setting step for which the same setting step ID is set as an attribute includes the automatic transmission enable tag. If the automatic transmission enable tag is included, the setup application determines that the setting step of the automatic transmission target is currently performed.

In S307, the setup application executes automatic transmission determination processing. The setup application compares the list of settable items of the printing apparatus 151 in the setting step acquired in S304 with the setting of the terminal apparatus 101, and determines whether automatic transmission is executable.

Figure 8:
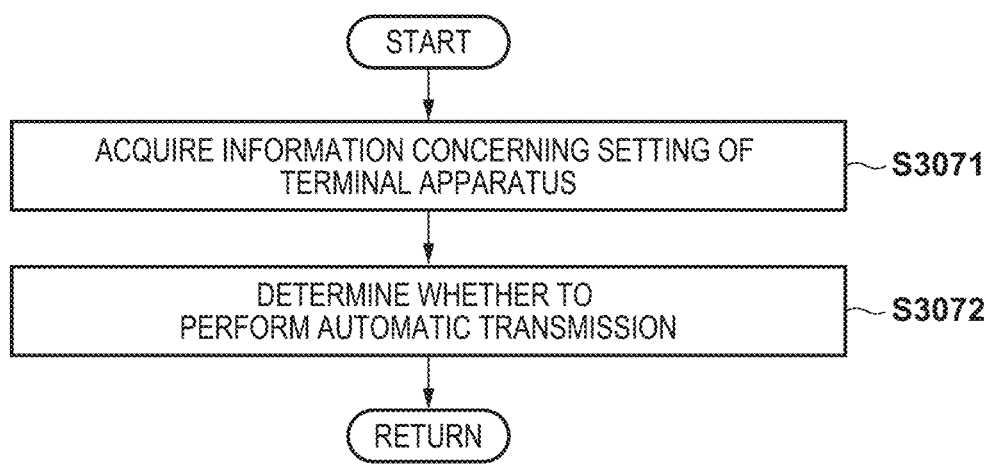
FIG. 8 is a flowchart illustrating an example of processing by the CPU of the terminal apparatus.

FIG. 8 is a flowchart illustrating a practical example of the processing in S307.

In S3071, the setup application acquires information concerning the setting of the terminal apparatus 101. The language set by the terminal apparatus 101 is recognized when the setup application acquires the language code of the currently set language from the OS. The information acquired from the OS by the setup application is not limited to the language code and may be the country code or the like.

In S3072, the setup application compares the information acquired in S3071 with the information concerning the setting item of the printing apparatus 151, and determines whether to perform automatic transmission of the setting information of the terminal apparatus 101 to the printing apparatus 151. For example, when setting the language of the printing apparatus 151, the setup application acquires, as the settable item list included in the setting step information in S304, a list of languages settable by the printing apparatus 151. If the language set by the terminal apparatus 101 exists in the list of languages settable by the printing apparatus 151, it is determined that it is possible to automatically transmit, to the printing apparatus 151, the language set by the terminal apparatus 101. That is, the setup application determines that it is possible to set the printing apparatus 151 using the setting information of the terminal apparatus 101, and determines to transmit, to the printing apparatus 151, the information concerning the setting item of the printing apparatus 151 based on the setting information of the terminal apparatus 101. On the other hand, if the language set by the terminal apparatus 101 does not exist in the list of languages settable by the printing apparatus 151, the setup application determines that automatic transmission is impossible.

If the priority level of the language is set in addition to the language set by the terminal apparatus 101, the setup application may perform comparison with the list of languages settable by the printing apparatus 151 in accordance with the priority level. Alternatively, the setup application may determine the use language of the user from the position information of the terminal apparatus 101.

If it is determined in the processing of step S307 that automatic transmission is possible, the setup application advances from S308 to S309; otherwise, the setup application advances from S308 to S310.

In S309, the setup application transmits automatic transmission enable terminal setting information to the printing apparatus 151, and returns to S304. The automatic transmission enable terminal setting information is, for example, a language code of "Japanese" when the terminal apparatus 101 sets "Japanese".

In S310, the setup application creates a setup guidance screen from the guidance content acquired in S303 and the setting step information acquired in S304, displays it to the user via the display unit 108, and returns to S304. That is, the setup application executes display control to cause the display unit 108 to display the setting item of the printing apparatus 151. The setup guidance screen displayed on the display unit 108 may be configured so that the user can input a setting by operating the display unit 108 or may be configured to display only an operation guidance when the physical setting of the printing apparatus 151 is required.

Note that the setup application may hold the setup state information acquired in S304, and compare the setup state information acquired in S304 last time with that newly acquired by returning from S309 or S310 to S304. If the information remains unchanged, the setup application may skip the processing of S305 and re-execute S304 after a predetermined time elapses.

Steps S304 to S310 are repeated until the completion of the setup is determined in S305.

Figure 4:
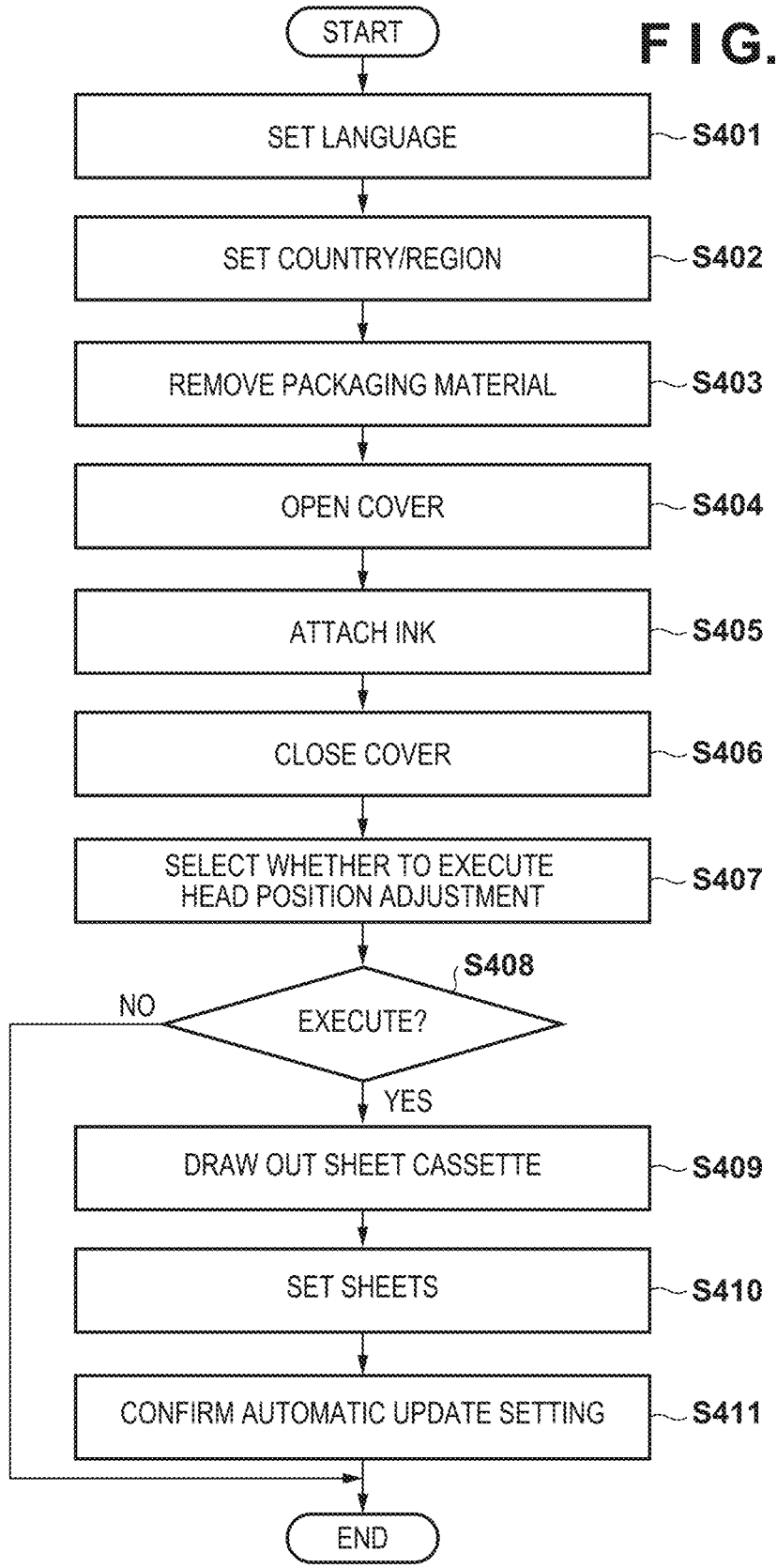
FIG. 4 is a flowchart illustrating a practical example of each setting step in a setup when a printing apparatus is initially activated after arrival.

FIG. 4 is a flowchart for explaining each setting step in a setup when the printing apparatus 151 is initially activated after arrival. For example, when the printing apparatus 151 is initially activated after arrival, it operates in a setting mode for performing an initial setup. The setup application detects the current setting step of the printing apparatus 151 by communicating with the printing apparatus 151 at a predetermined interval, and executes the processing shown in FIG. 3 for the detected setting step. In each setting step, if all the processes to be executed in the step are complete, the process advances to the next step. Therefore, if the user makes the setting in advance, and need not make the setting again, the step is skipped.

In all steps S401 to S411 in FIG. 4, the completion determination information includes information for determining that the setup is incomplete. In S401 and S402, the automatic transmission enable/disable information includes information for determining that automatic transmission is possible. On the other hand, in S403 and the subsequent steps, the automatic transmission enable/disable information includes information for determining that automatic transmission is impossible.

S401 is a step of setting a language in the printing apparatus 151. If the language set in the terminal apparatus 101 exists in the list of languages settable by the printing apparatus 151, automatic transmission of information concerning the language setting is executed based on the flowchart shown in FIG. 3 (YES in S308→S309). On the other hand, if the language set in the terminal apparatus 101 does not exist in the list of languages settable by the printing apparatus 151, the list of languages is displayed on the display unit 108 (NO in S308→S310).

S402 is a step of setting a country/region in the printing apparatus 151. If the country/region set in the terminal apparatus 101 exists in a list of countries/regions settable by the printing apparatus 151, automatic transmission is executed based on the flowchart shown in FIG. 3 (YES in S308→S309). On the other hand, if the country/region set in the terminal apparatus 101 does not exist in the list of countries/regions settable by the printing apparatus 151, the list of countries/regions is displayed on the display unit 108 (NO in S308→S310).

S403 is a step of removing the packaging material of the printing apparatus 151. Since this step is not the target step of automatic transmission, if a head storing ink tanks of the printing apparatus 151 is fixed by the packaging material, the terminal apparatus 101 displays a method of removing the packaging material on the display unit 108 (NO in S306→S310). Note that in the subsequent steps as well, the terminal apparatus 101 displays necessary information on the display unit 108 in S306 and S310 of FIG. 3.

S404 is a step of waiting for the cover of the printing apparatus 151 to be opened. The terminal apparatus 101 displays, on the display unit 108, a method of opening the cover to attach an ink tank to the printing apparatus 151.

S405 is a step of attaching an ink tank to the printing apparatus 151. The terminal apparatus 101 displays, on the display unit 108, a method of attaching an ink tank to the printing apparatus 151.

S406 is a step of waiting for the cover of the printing apparatus 151 to be closed. The terminal apparatus 101 displays, on the display unit 108, a method of closing the cover after the ink tank is attached to the printing apparatus 151.

S407 is a step of selecting whether to execute processing of adjusting the position of the head of the printing apparatus 151. The terminal apparatus 101 displays, on the display unit 108, a screen for prompting the user to select whether to execute the processing of adjusting the position of the head to improve the printing quality of the printing apparatus 151.

S408 is conditional branching concerning adjustment of the position of the head. If execution of the processing of adjusting the position of the head is selected in S407, the printing apparatus 151 advances to S409; otherwise, the flowchart ends.

S409 is a step of waiting for the sheet cassette of the printing apparatus 151 to be drawn out. The terminal apparatus 101 displays, on the display unit 108, a method of drawing out the sheet cassette of the printing apparatus 151.

S410 is a step of waiting for sheets to be set in the sheet cassette of the printing apparatus 151. The terminal apparatus 101 displays, on the display unit 108, a method of setting sheets in the sheet cassette.

S411 is a step of confirming the automatic update setting of the printing apparatus 151. The terminal apparatus 101 displays, on the display unit 108, a screen for prompting the user to select whether to make a setting for performing updating by automatically acquiring the firmware of the printing apparatus 151 from the server.

Based on the fact that the above steps are complete, the printing apparatus 151 updates the completion determination information by the information indicating the completion of the setup.

The flowchart shown in FIG. 4 includes a step of displaying, on the display unit 108, a screen for explaining a setting item to be set by the user in this embodiment, but the display contents are not limited to this. For example, in S406 and S407, a screen showing a state in which confirmation processing after the ink tank is attached is in progress may be displayed. Furthermore, for example, in S409 and S410, a screen showing a state in which the head position adjustment processing is in progress may be displayed. In this way, a screen showing, to the user, a state in which the printing apparatus 151 currently executes some processing may be displayed.

FIG. 5 is a view showing examples of the screen of the terminal apparatus 101. More specifically, FIG. 5 shows the actual setup guidance screen displayed, in S310 of FIG. 3, on the display unit 108 based on the guidance content acquired in S303 and the setting step information acquired in S304 by the setup application. While the printing apparatus 151 executes each of setting steps S401 to S411 of the flowchart shown in FIG. 4, the terminal apparatus 101 repeatedly executes the series of processes of S304 to S310 of FIG. 3. Therefore, if the setting step on the side of the printing apparatus 151 changes in S310, the setup application displays the setup guidance screen of the corresponding setting step. FIG. 5 shows examples of the setup guidance screen of the setting steps in S401, S404, S405, and S407.

A screen 500*a* is displayed in S401 when the language does not exist in the list of languages settable by the printing apparatus 151. A screen 500*b* is displayed in S404. A screen 500*c* is displayed in S405. A screen 500*d* is displayed in S407. When such screen is displayed on the display unit 108, it is possible to prompt the user to perform an operation for making various settings.

As described above, according to this embodiment, it is possible to use the setting information of the terminal apparatus 101 for the setting of the printing apparatus 151, and it is thus possible to readily set the printing apparatus 151. Therefore, it is possible to improve usability in the setting of the apparatus.

Furthermore, with respect to the setting item for which the setting information of the terminal apparatus 101 cannot be used, it is possible to prompt the user to perform a setting operation by displaying an explanatory screen on the display unit 108 of the terminal apparatus 101.

Second Embodiment

In the first embodiment, the setup of the printing apparatus 151 is performed in each setting step. The present invention, however, is not limited to this. For example, an arrangement in which setting steps in which automatic transmission is possible are collectively executed can be adopted.

Figure 6:
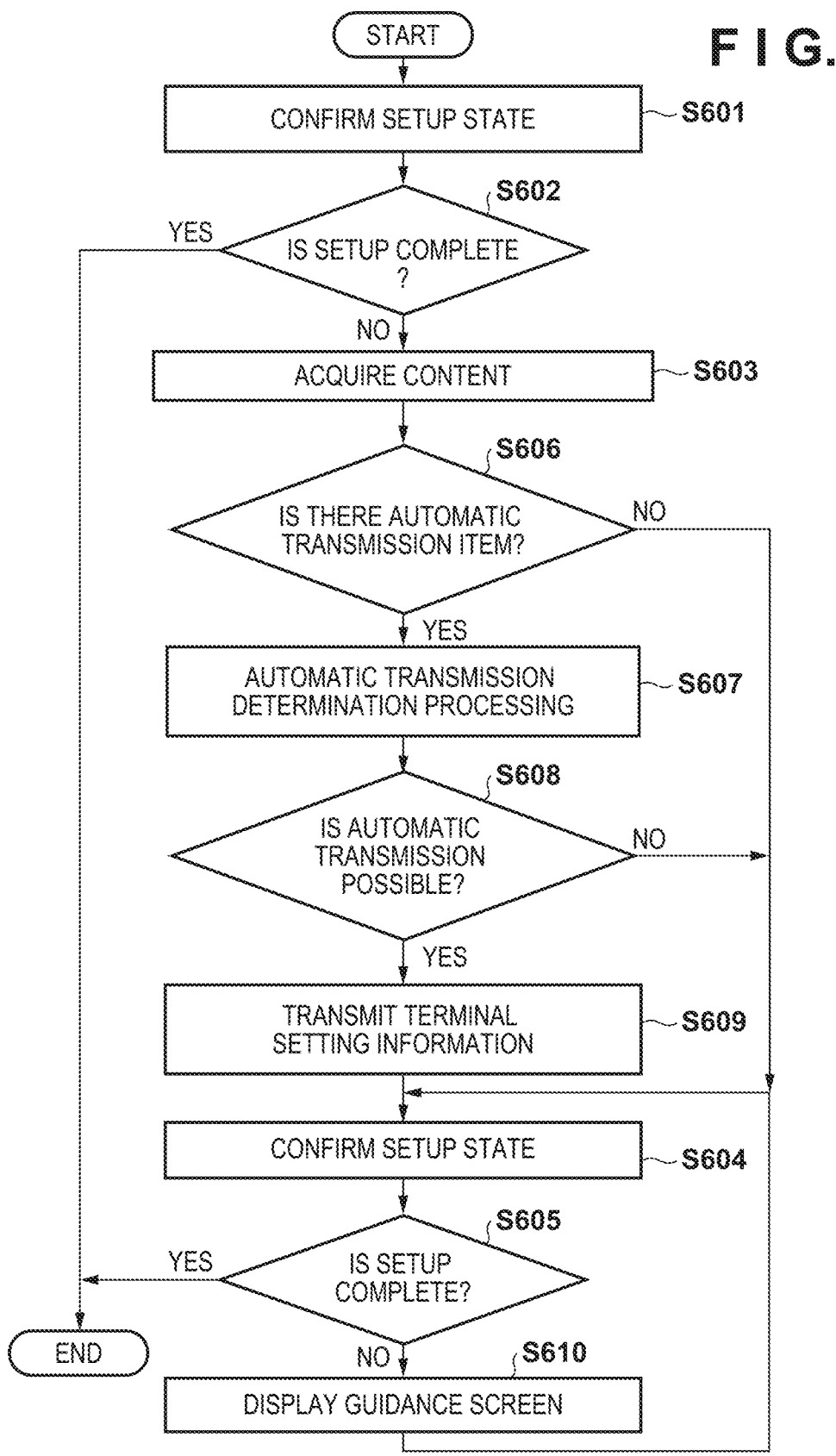
FIG. 6 is a flowchart illustrating an example of processing by a CPU of a terminal apparatus.

FIG. 6 is a flowchart illustrating an example of processing by a CPU 102 of a terminal apparatus 101. More specifically, FIG. 6 is a flowchart illustrating an example of processing by the CPU 102 when the setting steps of a printing apparatus 151 in which automatic transmission is possible are collectively executed. Note that a description of the same processes as those in the flowchart shown in FIG. 3 will be omitted.

Processes in S602 to S605 and S610 are the same as those in S302 to S305 and S310, respectively.

Processes in S601 and S606 to S609 are similar to those in S301 and S306 to S309, respectively. The difference is that S306 to S309 are executed for one setting item while S606 to S609 are applicable to a plurality of setting items.

For example, among the setting steps shown in FIG. 4, two steps of S401 and S402 are steps in which automatic transmission is possible and thus the following processing is performed.

In S601, the setup application acquires a list of pieces of automatic transmission enable setting step information in addition to information that can be acquired in S301.

In S606, the setup application confirms whether the automatic transmission enable setting step information acquired in S601 includes a setting step. If at least one setting step is included, the process advances to S607; otherwise, the process advances to S604.

In S607 and S608, the setup application compares the list of settable items of the printing apparatus 151 with the corresponding setting of the terminal apparatus 101 with respect to each piece of setting step information included in the list of pieces of automatic transmission enable setting step information acquired in S601, and determines whether automatic transmission is executable. If there exists at least one setting step in which automatic transmission is executable, the process advances to S609; otherwise, the process advances to S610.

In S609, the setup application transmits, to the printing apparatus 151, the setting item of the setting step in which automatic transmission is possible. As described above, in this embodiment, the setting items that can automatically be transmitted can initially, collectively be transmitted to the printing apparatus 151. This allows the printing apparatus 151 to collectively set the setting items settable based on the information of the terminal apparatus 101. Therefore, it is possible to skip the setting step shown in FIG. 4, as needed, thereby efficiently executing the initial setup.

Other Embodiments

A communication apparatus communicable with the terminal apparatus 101 (information processing apparatus) as an external apparatus is the printing apparatus 151 in this embodiment, but may be another communication apparatus. For example, an image reading apparatus such as a scanner that reads a document using a reading element or a processing apparatus that performs predetermined processing may be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-072750, filed Apr. 22, 2021, which is hereby incorporated by reference herein in its entirety.

What is claimed is:

1. A non-transitory computer-readable storage medium storing one or more programs including executable instructions to cause a computer to perform a method of controlling an information processing apparatus including a communication unit communicable with an external apparatus, the method comprising:
  receiving first information indicating a setup state of the external apparatus, transmitted from the external apparatus;
  acquiring second information concerning a setting of the information processing apparatus, wherein the second information is information which has been set in the information processing apparatus before the first information is received;
  in a case where it is determined that the received first information indicates a first setup state, performing display processing to display, on a display of the information processing apparatus, guidance content for providing guidance for a setup of the external apparatus corresponding to the first setup state;
  in a case where it is determined that the received first information indicates a second setup state different from the first setup state, performing automatic transmission processing to transmit a setting value corresponding to the acquired second information to the external apparatus corresponding to the second setup state, without accepting a selection operation of a setting value from a user,
  wherein, in a case where the transmitted setting value corresponding to the second information is set in the external apparatus, a setup state of the external apparatus is changed, and the first information corresponding to the changed setup state is received from the external apparatus, the display processing or the automatic transmission processing corresponding to the received first information is performed.

2. The medium according to claim 1, wherein a setting item specified by the first information is a setting item concerning a use language.

3. The medium according to claim 1, wherein a setting item specified by the first information is a setting item concerning at least one of a country and a region.

4. The medium according to claim 1, wherein the method further comprises:
  confirming a setup state of the external apparatus, and requesting, if it is confirmed that a setup of the external apparatus is incomplete, the first information of the external apparatus.

5. The medium according to claim 1, wherein the first information includes a list of one or more setting values, and
  if a setting value included in the second information is included in the list, the included setting value is transmitted to the external apparatus in the automatic transmission processing, without accepting the selection operation from the user.

6. The medium according to claim 1, wherein the first information includes a list of one or more setting values, and
  if a setting value included in the second information is not included in the list, the list is displayed and the selection operation is accepted from the user.

7. The medium according to claim 1, wherein the external apparatus is a printer, and a setting item specified by the first information is a setting item for an initial setup of the printer.

8. The medium according to claim 1, wherein the at least one memory and the at least one processor further function to:
  determine, based on the received first information, whether the external apparatus is in a setting step of a target of the automatic transmission, and
  determine, if it is determined that the external apparatus is in the setting step, whether the automatic transmission is executable.

9. The medium according to claim 8, wherein the setting step includes a step of setting at least one of language, region, attaching an ink tank, and setting a sheet.

10. The medium according to claim 1, wherein the method further includes performing direct wireless communication without going through an external access point between the information processing apparatus and the external apparatus, and performing wireless communication via the external access point based on a fact that the information processing apparatus transmits connection information of the external access point to the external apparatus by the direct wireless communication and the external apparatus connects to the external access point using the connection information, wherein the information processing apparatus receives the first information from the external apparatus by the wireless communication via the external access point.

11. The medium according to claim 1, wherein in the display processing, the information processing apparatus obtains the guidance content from an external server and displays the obtained guidance content.

12. The medium according to claim 1, wherein the first setup state includes a state of a step of attaching an ink tank on the external apparatus, and the second setup state includes a state of a step of setting at least one of a language, a country, and a region on the external apparatus.

13. An information processing apparatus communicable with an external apparatus, the information processing apparatus comprising:

a communication unit; and at least one memory and at least one processor that function to:

receive first information indicating a setup state of the external apparatus, transmitted from the external apparatus;

acquire second information concerning a setting of the information processing apparatus, wherein the second information is information which has been set in the information processing apparatus before the first information is received;

in a case where it is determined that the received first information indicates a first setup state, perform display processing to display, on a display of the information processing apparatus, guidance content for providing guidance for a setup of the external apparatus corresponding to the first setup state;

in a case where it is determined that the received first information indicates a second setup state different from the first setup state, perform automatic transmission processing to transmit a setting value corresponding to the acquired second information to the external apparatus corresponding to the second setup state, without accepting a selection operation of a setting value from a user, wherein, in a case where the transmitted setting value corresponding to the second information is set in the external apparatus, a setup state of the external apparatus is changed, and the first information corresponding to the changed setup state is received from the external apparatus, the display processing or the automatic transmission processing corresponding to the received first information is performed.

14. The information processing apparatus according to claim 13, wherein a setting item specified by the first information is a setting item concerning a use language.

15. The information processing apparatus according to claim 13, wherein a setting item specified by the first information is a setting item concerning at least one of a country and a region.

16. The information processing apparatus according to claim 13, wherein the at least one memory and the at least one processor further function to:

confirm a setup state of the external apparatus; and request, if it is confirmed that a setup of the external apparatus is incomplete, the first information of the external apparatus.

17. The information processing apparatus according to claim 13, wherein the at least one memory and the at least one processor further function to determine whether the external apparatus is in a setup state in which the setting value is to be automatically transmitted to the external apparatus based on the received first information, and the automatic transmission processing is performed based on a result of the determination.

* * * * *